(12) United States Patent
Zygan-Maus

(10) Patent No.: US 7,366,503 B2
(45) Date of Patent: Apr. 29, 2008

(54) METHOD FOR ADMINISTERING A SERVICE FOR A SUBSCRIBER

(75) Inventor: Renate Zygan-Maus, München (DE)

(73) Assignee: Siemens Aktiengesellschaft, Munich (DE)

( * ) Notice: Subject to any disclaimer, the term of this patent is extended or adjusted under 35 U.S.C. 154(b) by 28 days.

(21) Appl. No.: 11/362,112

(22) Filed: Feb. 27, 2006

(65) Prior Publication Data

US 2006/0205405 A1    Sep. 14, 2006

Related U.S. Application Data

(63) Continuation of application No. 09/762,259, filed as application No. PCT/EP99/05651 on Aug. 4, 1999, now abandoned.

(30) Foreign Application Priority Data

Aug. 5, 1998    (DE) ................. 981 14 751

(51) Int. Cl.
*H04Q 7/20*    (2006.01)
(52) U.S. Cl. .............. 455/417; 455/445; 455/415
(58) Field of Classification Search ........... 455/406, 455/407, 408, 409, 445, 414.1
See application file for complete search history.

(56) References Cited

U.S. PATENT DOCUMENTS 5,539,807 A    7/1996    Ghisler et al.
5,729,598 A    3/1998    Kay
5,774,533 A    6/1998    Patel
5,903,833 A *    5/1999    Jonsson et al. ......... 455/445 X
6,324,402 B1    11/2001    Waugh

FOREIGN PATENT DOCUMENTS

| EP | 0602799 | 6/1994 |
|---|---|---|
| EP | 0734143 | 9/1996 |
| EP | 0738093 | 10/1996 |
| EP | 0844799 | 5/1998 |
| WO | WO 98/09425 | 3/1998 |

OTHER PUBLICATIONS

International Search Report PCT/EP99/05651, Feb. 17, 2000.

* cited by examiner

*Primary Examiner*—Philip J. Sobutka
(74) *Attorney, Agent, or Firm*—Neifeld IP Law, PC

(57) ABSTRACT

The invention prevents the need for a subscriber to input a PIN to book a service with the purpose of managing this service from the subscriber side. This is achieved by using a mobile network terminal for the management. The mobile subscriber reports a subscriber number of a fixed network terminal to the service, in which the subscriber number thus reported is allocated to the mobile network subscriber so that the mobile network subscriber can thereafter use the fixed network terminal for the special service, namely by debiting an account opened by the service.

9 Claims, 1 Drawing Sheet

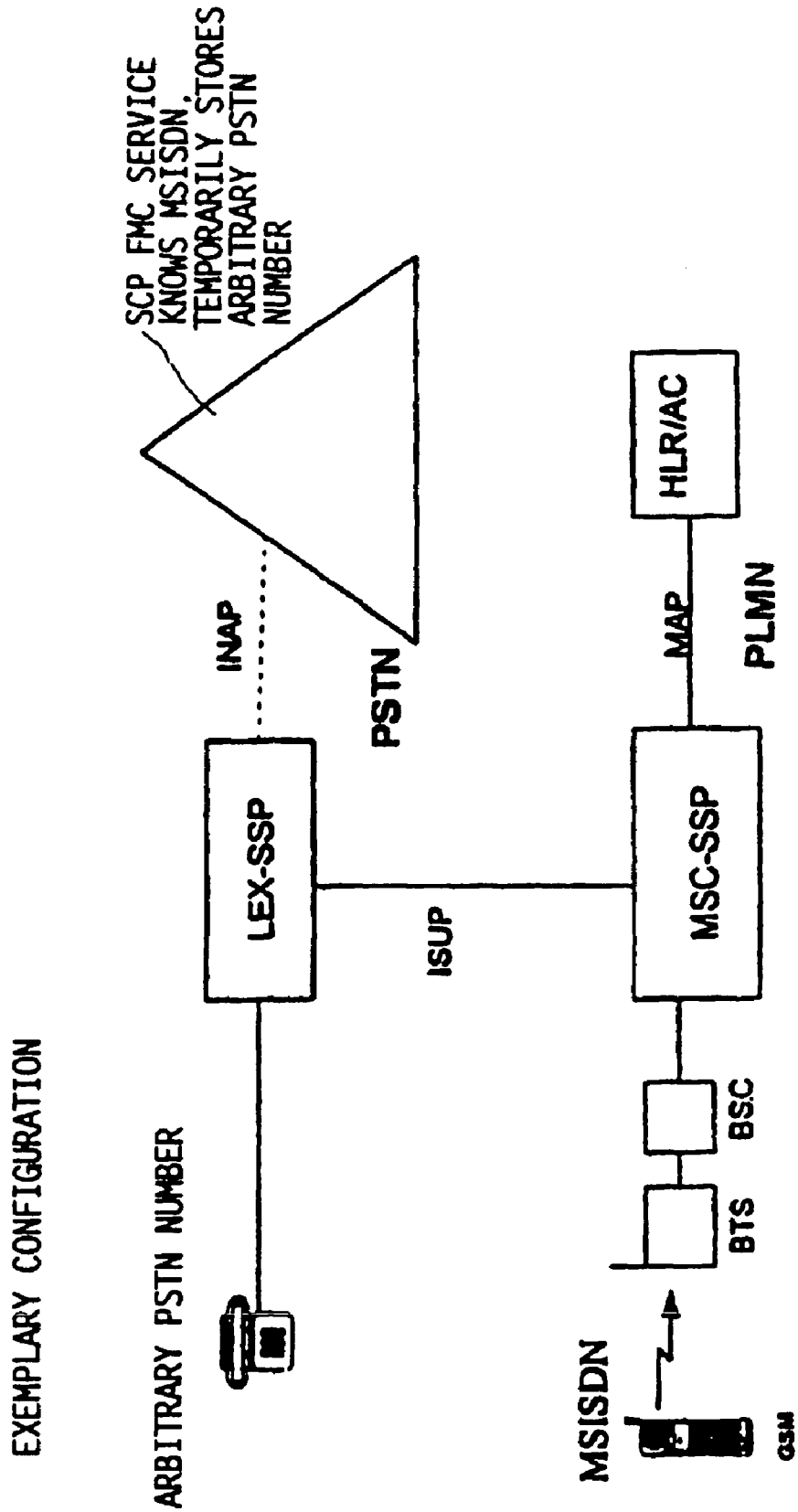

METHOD FOR ADMINISTERING A SERVICE FOR A SUBSCRIBER

CROSS REFERENCE TO RELATED APPLICATIONS

This application is a continuation of U.S. application Ser. No. 09/762,259 filed 2 Feb. 2001, now abandoned, which is a U.S. national stage entry of PCT application no. PCT/EP 99/05651, filed 4 Aug. 1999.

U.S. application Ser. No. 09/762,259 is incorporated herein by reference. PCT application no. PCT/EP 99/05651 is incorporated herein by reference.

BACKGROUND OF THE INVENTION

1. Field of the Invention

The invention relates to a method and associated logic for administering a function of a service in a telecommunications network.

2. Description of the Related Art

For using an FMC (fixed-mobile converged) service, the subscriber must be unambiguously identified and authorized (for example, in order to be able to carry out a correct charging). For fixed-mobile converged services such as PCS (personal communication service) and CCS (corporate communication service), the service user sometimes employs a mobile terminal device and sometimes employs a fixed network terminal device.

In the mobile radiotelephone network, the unambiguous identification of the subscriber ensues automatically via a SIM (subscriber identity module) card. The identification of the subscriber can also ensue automatically in the fixed network when the subscriber uses a terminal device that is administratively known to the FMC service and that is allocated to the subscriber, and when the fixed network supplies the calling line identity (connection number) of this fixed network terminal device to the FMC service logic.

When using an arbitrary fixed network terminal (i.e., a fixed network terminal that was not administratively allocated to the subscriber by the FMC service), an automatic identification of the subscriber is not possible. However, a registration at one's own fixed network terminal device for employing this terminal device via a specific FMC service is also not possible, even though this would be meaningful in certain cases (for example, for teleworkers when specific calls from the connection are to be at the expense of the company (CCS service)).

Up to now, the fixed network has supported the use of outside terminals at one's own expense or of one's own terminal at the expense of a third party only via the possibility of identifying and authenticating the calling party via an in-band dialogue. To that end, the calling party (for example, an IN service subscriber) must input a personal identification number (PIN) that the service logic compares to data stored in the network (for example, for credit card services or for UPT). Such prior art is known, for example, from the European Patent document EP-A-0 602 779.

Furthermore, the International Patent document WO 98 09425 A discloses a system for handling calls with whose assistance a fixed network terminal device that is to be employed for the continuation of the call can be indicated given an initiation of a call via a mobile network terminal device.

Finally, the European Patent document EP-A-0844 799 discloses a communication system for handling calls with whose assistance a mobile network subscriber can indicate via said subscriber's mobile network terminal device whether calls directed to this subscriber should be routed to a prescribable fixed network terminal device.

SUMMARY OF THE INVENTION

The invention is based on the object of facilitating the employability of a fixed network terminal device via a specific service for a mobile network subscriber.

BRIEF DESCRIPTION OF THE DRAWINGS

An exemplary embodiment of the invention is explained in greater detail below with reference to the single FIGURE, which is a block schematic diagram showing the inventive arrangement.

DESCRIPTION OF THE PREFERRED EMBODIMENTS

The FIGURE represents an exemplary configuration in which the realization of the inventive service logic is based on an intelligent network IN. An inventive FMC service, however, need not necessarily be realized on a service control point SCP of an IN.

For an FMC service whose service logic is realized in a service control point SCP, the caller has a mobile telephone GSM available. For an access of the subscriber to the FMC service via the mobile telephone, the FMC service logic receives the mobile radiotelephone number MSISDN of the FMC service subscriber that is administratively known to the FMC service logic and that was authenticated in the mobile radiotelephone network PLMN (given an IN-based FMC service, for example, the mobile radiotelephone number of the FMC service subscriber is transmitted in the CallingPartyNumber parameter of the standardized IN protocol, see ETSI Core INAP or ITU-T Recommendations Q.1218/Q.1228). The FMC service logic can automatically identify and authorize the FMC subscriber on the basis of the subscriber's mobile radiotelephone number.

This can be utilized by the subscriber of the FMC service for the use of an arbitrary fixed network terminal device in a fully digital fixed network PSTN that transmits the CallingLineIdentity in order to avoid the employment of a PIN. The procedure for this is as follows:

Phase 1:

The subscriber selects an FMC service access code at the mobile telephone GSM. The access request is potentially forwarded to the FMC service across network boundaries (here, from a mobile network PLMN via a digital fixed network PSTN). The FMC service automatically identifies the subscriber on the basis of the subscriber's mobile radiotelephone number MSISDN. The FMC service responds by initiating that the subscriber should now inform the service of a connection number of a fixed network terminal device. Via voice or DTMF input, the subscriber enters the CallingLineIdentity of the fixed network terminal device that he would like to use at his own expense for outgoing calls or other line-switched services (for example, data transmission) for a definable time duration or, respectively, until an explicit de-registration. The FMC service subsequently registers the terminal device and assigns it to the subscriber. Optionally, the FMC service can communicate a selection code to the subscriber that is to be additionally employed for utilization of this fixed network terminal device (the service can distinguish between a plurality of inventive outside users of the fixed network terminal device on the basis of the selection code).

Phase 2:

The subscriber selects a specific FMC service access code at the fixed network terminal device and, optionally, an additional, temporary selection code before the destination telephone number. The FMC service access number is triggered in the fixed network and an inquiry is made at the FMC service logic (for example, with the existing IN procedures). This identifies the FMC service subscriber on the basis of the CallingLineIdentity of the fixed network terminal device registered in Phase 1 that is co supplied in a fully digital fixed network and (optionally) also on the basis of the temporary selection code in the selected numbers (INAP parameter CalledPartyNumber), and decides about further handling of the call (for example, charge accrual) on the basis of the FMC service subscriber profile). The FMC service logic controls the further handling of the call (for example, according to the existing IN procedures). The freedom from cost for the owner of the fixed network terminal can be assured on the basis of the selected, specific FMC service access code in the fixed network subscriber switching center on the basis of administrative data or controlled by the FMC service logic (for example, with the assistance of existing IN procedures).

The FMC service subscriber can also use the registered fixed network terminal device for subsequent calls in the same way without requiring a separate PIN, namely until a de-registration takes place.

Phase 3:

Either automatically after the expiration of a prescribable time and/or by an explicit de-registration procedure via the mobile telephone, the fixed network terminal device that has been employed loses the property of being able to be used by the FMC service subscriber at the subscriber's own expense or of being able to be used by the FMC service subscriber at the expense of a third party.) For an explicit de-registration procedure, which is again to be implemented via the mobile network terminal device, analogous to the registration procedure, the FMC service checks whether there is already a registration for the CallingLineIdentity indicated by the subscriber. When this is the case, the de-registration is implemented.)

The administration of subscriber-individual PINS for the use of arbitrary fixed network terminals is thus superfluous for FMC services.

FMC service sub-functions other than the described method for using arbitrary fixed network terminals can also be administered without the employment of a PIN by the subscriber when the subscriber implements the administration only via his mobile radiotelephone. The required subscriber identification is carried out by the mobile radiotelephone network in the same way as described for the method for using arbitrary fixed network terminals. Subscriber-individual PINS can thus be generally foregone in FMC services when all subscriber inputs for administration of services ensue only via the subscriber's mobile radiotelephone.

Abbreviations Employed:
BTS: base transceiver system
BSC: base station controller
HLR/AC: home location register/authentication center
IN: intelligent network
INAP: In application protocol
ISUP: ISDN user part
LEX-SSP: Local exchange with SSP functionality
MSC-SSP: Mobile switching center with SSP functionality
MAP: mobile application part
PSTN: Public switched telephone network
PLMN: public land mobile network
SSP: service switching point The above-described method and associated logic are illustrative of the principles of the present invention. Numerous modifications and adaptations thereof will be readily apparent to those skilled in this art without departing from the spirit and scope of the present invention.

The invention claimed is:

1. A method for administering a service for a subscriber of a fixed-mobile convergence (FMC) service, wherein a mobile network terminal device is employed for said administration, comprising:
    said subscriber using said subscriber's mobile telephone to select a FMC service access code;
    said subscriber forwarding said FMC service access code to an FMC service;
    said FMC service using said subscriber's mobile telephone identification to identify said subscriber;
    said FMC service prompting said subscriber to inform said FMC service of a connection number of a fixed network terminal device;
    in response to said prompt, said subscriber communicating to said FMC service a calling line identity of said fixed network terminal device;
    in response, said FMC service registering said fixed network terminal device to said subscriber;
    said subscriber selecting a specific FMC service access code at said fixed network terminal device;
    in response to a call originating from said fixed network terminal device, said FMC service triggering said FMC service access number in the fixed network of said fixed network access device, resulting in an inquiry sent to said FMC service including said calling line identity of said fixed network terminal device; and
    upon said FMC service identifying said fixed network terminal device in association with said subscriber, said FMC service applying logic controls for handling said call.

2. The method of claim 1, further comprising:
    said FMC service allocating said calling line identity to said subscriber so that said subscriber can use said fixed network terminal device via said FMC service, namely at the expense of an account defined by said FMC service.

3. The method of claim 2, further comprising:
    after communication from said subscriber to said FMC service of said calling line identity of said fixed network terminal device, said FMC service informing said subscriber of a selection code that is to be additionally employed given use of said fixed network terminal device via said FMC service.

4. The method of claim 3, further comprising
    automatically de-registering said fixed network terminal device that has been employed after expiration of a prescribable time and/or by an explicit de-registration procedure via the mobile telephone, so that said subscriber can not use said fixed network terminal device at the expense of said account defined by said FMC service.

5. A service logic for control of a fixed-mobile convergence service comprising:

said FMC service accepting requests for administering a service via a mobile network terminal device of a mobile network subscriber, and,
following a successful identification of said subscriber, said FMC service providing instructions as to how the administration of the service is to be effected; comprising:
said FMC service prompting said subscriber to inform said FMC service of a connection number of a fixed network terminal device;
in response to said prompt, said subscriber communicating to said FMC service a calling line identity of said fixed network terminal device;
in response, said FMC service registering said fixed network terminal device to said subscriber;
said subscriber selecting a specific FMC service access code at said fixed network terminal device;
in response to a call originating from said fixed network terminal device, said FMC service triggering said FMC service access number in the fixed network of said fixed network access device, resulting in an inquiry sent to said FMC service including said calling line identity of said fixed network terminal device; and
upon said FMC service identifying said fixed network terminal device in association with said subscriber, said FMC service applying logic controls for handling said call.

6. The service logic of claim 5, further comprising:
said FMC service allocating said calling line identity to said subscriber so that said subscriber can use said fixed network terminal device via said FMC service, namely at the expense of an account defined by said FMC service.

7. The service logic of claim 6, further comprising said FMC service informing said subscriber of a selection code that is to be additionally employed given use of said fixed network terminal device via said FMC service.

8. The service logic of claim 6, further comprising automatically de-registering said service logic after expiration of a prescribable time and/or by an explicit de-registration procedure via the mobile telephone, so that said subscriber can not use said fixed network terminal device at the expense of said account defined by said FMC service.

9. A method for administering a service for a subscriber of a fixed-mobile convergence (FMC) service, wherein a mobile network terminal device is employed for said administration, comprising:
the user of the fixed-mobile convergence service (FMC) selects an FMC service access code at his mobile telephone;
the FMC service identifies the user on the basis of the subscriber's mobile telephone number;
the user communicates a fixed telephone number to the FMC service;
the FMC service registers the fixed telephone to the user;
the user selects an FMC service access code at the fixed telephone;
the FMC service identifies the user on the basis of the CallingLineIdentity of the fixed telephone; and
the FMC service then handles the call to be made.

* * * * *